United States Patent
Reams et al.

(10) Patent No.: US 9,210,356 B2
(45) Date of Patent: Dec. 8, 2015

(54) SYSTEM AND METHOD FOR ENTERTAINMENT SYSTEM RECONFIGURATION

(75) Inventors: William Reams, Englewood, CO (US); Benjamin Mauser, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1415 days.

(21) Appl. No.: 12/330,368

(22) Filed: Dec. 8, 2008

(65) Prior Publication Data

US 2010/0146579 A1    Jun. 10, 2010

(51) Int. Cl.
| | | |
|---|---|---|
| H04N 7/173 | (2011.01) | |
| H04N 5/44 | (2011.01) | |
| H04N 5/765 | (2006.01) | |
| H04N 21/41 | (2011.01) | |
| H04N 21/4363 | (2011.01) | |
| H04N 21/482 | (2011.01) | |
| H04N 21/485 | (2011.01) | |

(52) U.S. Cl.
CPC ............ *H04N 5/4403* (2013.01); *H04N 5/765* (2013.01); *H04N 21/4104* (2013.01); *H04N 21/4126* (2013.01); *H04N 21/43637* (2013.01); *H04N 21/482* (2013.01); *H04N 21/485* (2013.01)

(58) Field of Classification Search
CPC . H04N 21/4126; H04N 5/4401; H04N 7/163; H04N 21/4622; H04N 21/482
USPC .................................. 725/153; 348/734, 552
See application file for complete search history.

(56) References Cited

U.S. PATENT DOCUMENTS

| | | |
|---|---|---|
| 4,903,307 A | 2/1990 | Ozawa et al. |
| 5,550,644 A | 8/1996 | So |
| 5,659,883 A | 8/1997 | Walker et al. |
| 5,886,847 A | 3/1999 | Lee et al. |
| 5,956,487 A | 9/1999 | Venkatraman et al. |
| 5,982,445 A | 11/1999 | Eyer et al. |
| 6,133,910 A | 10/2000 | Stinebruner |
| 6,333,739 B1 | 12/2001 | Koyama et al. |
| 6,628,344 B1 | 9/2003 | Weber |
| 7,375,673 B2 | 5/2008 | Spilo |

(Continued)

FOREIGN PATENT DOCUMENTS

WO    2006042318 A2    4/2006

OTHER PUBLICATIONS

International Search Report and Written Opinion dated Feb. 25, 2010, PCT/US2009/066998, 15 pages.

(Continued)

*Primary Examiner* — Benjamin R Bruckart
*Assistant Examiner* — Anthony Bantamoi
(74) *Attorney, Agent, or Firm* — Seed IP Law Group PLLC

(57) ABSTRACT

A method for reconfiguring an entertainment system to restore audio/video content to a user is presented. In the method, a request to reconfigure the entertainment system is received at a first component of the entertainment system. In response to the request, an indication of a configuration command for a second component of the entertainment system is transmitted from the first component to a remote control device. In response to receiving the indication of the configuration command at the remote control device, the configuration command is transmitted from the remote control device to the second component.

22 Claims, 6 Drawing Sheets

(56) References Cited

U.S. PATENT DOCUMENTS

| | | | |
|---|---|---|---|
| 7,640,327 B2 | 12/2009 | Humpleman et al. | |
| 7,805,751 B1* | 9/2010 | Dugan et al. | 725/153 |
| 7,886,318 B2 | 2/2011 | Wang et al. | |
| 8,082,572 B1 | 12/2011 | Tilford | |
| 2002/0057336 A1 | 5/2002 | Gaul et al. | |
| 2002/0174270 A1 | 11/2002 | Stecyk et al. | |
| 2004/0128402 A1 | 7/2004 | Weaver et al. | |
| 2006/0050142 A1 | 3/2006 | Scott et al. | |
| 2006/0244839 A1 | 11/2006 | Glatron et al. | |
| 2006/0253874 A1 | 11/2006 | Stark et al. | |
| 2007/0052547 A1 | 3/2007 | Haughawout et al. | |
| 2007/0118863 A1 | 5/2007 | Son et al. | |
| 2007/0150924 A1 | 6/2007 | Ichinose et al. | |
| 2007/0195195 A1* | 8/2007 | Hicks | 348/552 |
| 2007/0292135 A1* | 12/2007 | Guo et al. | 398/106 |
| 2008/0141316 A1 | 6/2008 | Igoe et al. | |
| 2008/0147371 A1 | 6/2008 | Gupton et al. | |
| 2008/0225184 A1 | 9/2008 | Hardacker et al. | |
| 2009/0167855 A1 | 7/2009 | Kummer | |
| 2009/0300620 A1 | 12/2009 | Park et al. | |
| 2010/0053462 A1 | 3/2010 | Candelore et al. | |
| 2010/0146579 A1 | 6/2010 | Reams et al. | |
| 2010/0169945 A1 | 7/2010 | Kennedy et al. | |
| 2010/0251303 A1 | 9/2010 | Ellis et al. | |
| 2010/0309389 A1 | 12/2010 | Hicks | |
| 2011/0040856 A1 | 2/2011 | Dugan et al. | |
| 2012/0280803 A1 | 11/2012 | Sutardja | |
| 2013/0208186 A1 | 8/2013 | Malone et al. | |

OTHER PUBLICATIONS

Preliminary Amendment dated Sep. 28, 2010, U.S. Appl. No. 12/891,804, 10 pages.
Office Action dated Mar. 4, 2011, U.S. Appl. No. 12/891,804, 17 pages.
Amendment and Response to Office Action dated May 20, 2011, U.S. Appl. No. 12/891,804, 13 pages.
Office Action dated Aug. 29, 2011, U.S. Appl. No. 12/891,804, 7 pages.
Response to Office Action dated Nov. 28, 2011, U.S. Appl. No. 12/891,804, 5 pages.
Office Action dated May 28, 2008, U.S. Appl. No. 11/117,819, 27 pages.
Amendment and Response to Office Action dated Sep. 26, 2008, U.S. Appl. No. 11/117,819, 18 pages.
Final Office Action dated Jan. 9, 2009, U.S. Appl. No. 11/117,819, 32 pages.
Request for Continued Examination and Amendment and Response to Final Office Action dated Apr. 3, 2009, 12 pages.
Office Action dated Jun. 8, 2009, U.S. Appl. No. 11/117,819, 17 pages.
Amendment and Response to Office Action dated Sep. 3, 2009, 12 pages.
Final Office Action dated Dec. 22, 2009, U.S. Appl. No. 11/117,819, 16 pages.
Notice of Appeal and Amendment After Final dated Feb. 19, 2010, 13 pages.
Appeal Brief dated Apr. 19, 2010, U.S. Appl. No. 11/117,819, 21 pages.
Notice of Allowance and Fee(s) Due dated Jul. 16, 2010, 4 pages.
Dugan et al., "Automatic Reconfiguration Device," Preliminary Amendment dated Sep. 28, 2010, for U.S. Appl. No. 12/891,804, 10 pages.
Dugan et al., "Automatic Reconfiguration Device," Office Action mailed Mar. 4, 2011, for U.S. Appl. No. 12/891,804, 17 pages.
Dugan et al., "Automatic Reconfiguration Device," Amendment dated May 20, 2011, for U.S. Appl. No. 12/891,804, 13 pages.
Dugan et al., "Automatic Reconfiguration Device," Office Action mailed Aug. 29, 2011, for U.S. Appl. No. 12/891,804, 7 pages.
Dugan et al., "Automatic Reconfiguration Device," Response to Office Action dated Nov. 28, 2011, for U.S. Appl. No. 12/891,804, 5 pages.
Dugan et al., "Automatic Reconfiguration Device," Office Action mailed May 28, 2008, for U.S. Appl. No. 11/117,819, 27 pages.
Dugan et al., "Automatic Reconfiguration Device," Response to Office Action dated Sep. 26, 2008, for U.S. Appl. No. 11/117,819, 18 pages.
Dugan et al., "Automatic Reconfiguration Device," Office Action mailed Jan. 9, 2009, for U.S. Appl. No. 11/117,819, 32 pages.
Dugan et al., "Automatic Reconfiguration Device," Response to Office Action dated Apr. 3, 2009, for U.S. Appl. No. 11/117,819, 12 pages.
Dugan et al., "Automatic Reconfiguration Device," Office Action mailed Jun. 8, 2009, for U.S. Appl. No. 11/117,819, 17 pages.
Dugan et al., "Automatic Reconfiguration Device," Response to Office Action dated Sep. 3, 2009, for U.S. Appl. No. 11/117,819, 12 pages.
Dugan et al., "Automatic Reconfiguration Device," Office Action mailed Dec. 22, 2009, for U.S. Appl. No. 11/117,819, 16 pages.
Dugan et al., "Automatic Reconfiguration Device," Response to Office Action dated Feb. 19, 2010, for U.S. Appl. No. 11/117,819, 12 pages.
Dugan et al., "Automatic Reconfiguration Device," Appeal Brief dated Apr. 19, 2010, for U.S. Appl. No. 11/117,819, 21 pages.
Dugan et al., "Automatic Reconfiguration Device," Notice of Allowance mailed Jul. 16, 2010, for U.S. Appl. No. 11/117,819, 4 pages.
First Office Action for corresponding EP Application No. 09 793 375.8-1902; mailed Jan. 15, 2015; 7 pages.

* cited by examiner

SYSTEM AND METHOD FOR ENTERTAINMENT SYSTEM RECONFIGURATION

BACKGROUND

The home entertainment business continues to grow, offering an ever-increasing array of entertainment products or components, such as televisions or video monitors, television set-top boxes, digital video recorders (DVRs), digital video disc (DVD) players, audio receivers/amplifiers, multiple-speaker systems, and the like. Typically, such components are designed to be connected together to create a single entertainment system capable of providing various forms of entertainment, such as broadcast television programming from satellite, cable, and/or terrestrial sources, broadcast radio content, DVD-based movies, music stored on Compact Disc (CD), and music recorded in Motion Picture Experts Group 1, Audio Layer 3 (MP3) format, to a user.

With this advanced capability typically comes increased complexity. For example, entertainment systems that include just a handful of components often require multiple cable connections between the various components. Also, to allow the user to enjoy the desired content, the components normally must be configured in a specific fashion. For example, when an audio/video output of a television set-top box is connected to an input of a television, the television must be configured appropriately for content from the set-top box to be displayed on the television. More specifically, if the set-top box output is connected to a High Definition Multimedia Interface (HDMI) input of the television, the television must be configured to receive and process the audio/video signals from the HDMI input, as opposed to those associated with another input of the television. If, instead, a modulated output of the set-top box is connected to an input of the television, the tuner of the television must be set to the proper channel or frequency employed by the set-top box to transmit the content in order to present the content to the user.

In addition, once the entertainment system is properly configured to present the desired content to the user, the possibility of inadvertently changing the configuration of one or more components, and thus accidentally terminating the delivery of content to the user, in significant. Continuing the example from above, a user may mistakenly press a button on a remote control that alters the configuration of the set-top or the television, thus terminating the display of the television content. Further, if the user is not familiar with the entertainment system, and how the various components are connected to each other, returning the entertainment system to its previously operational configuration may be difficult.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
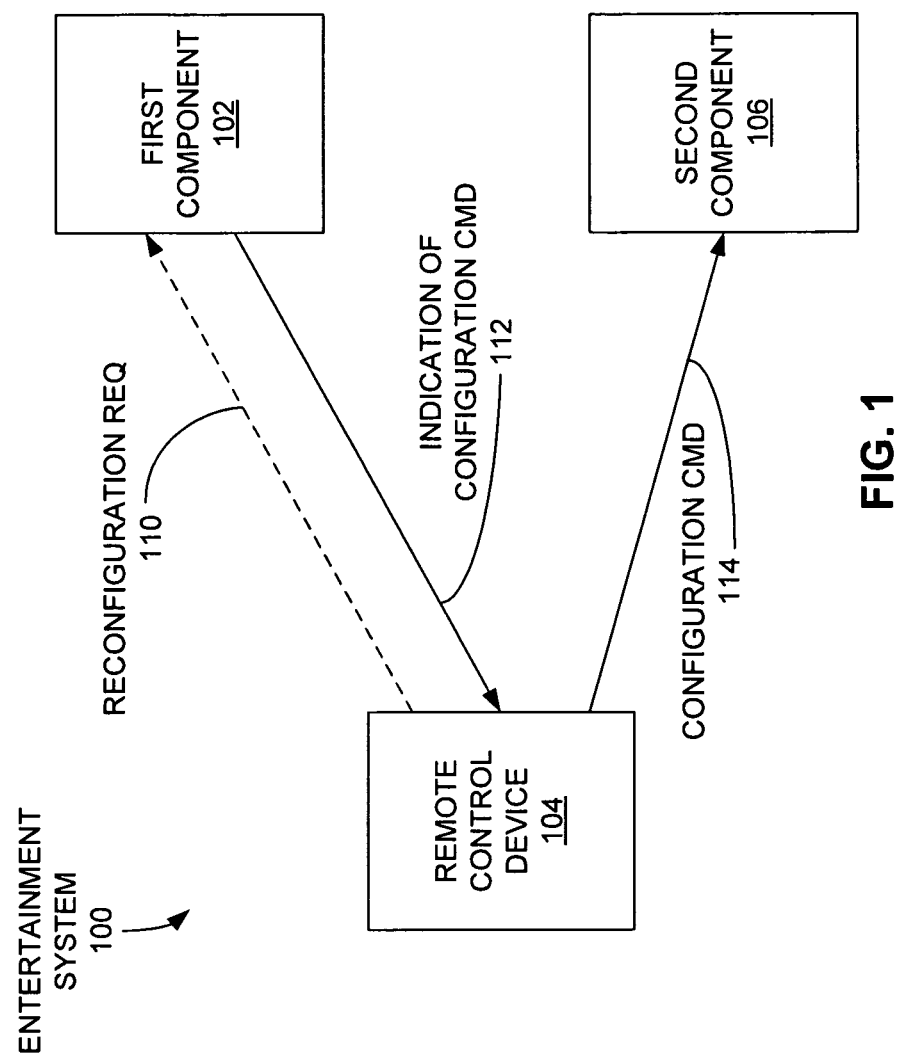
FIG. 1 is a block diagram of an entertainment system according to an embodiment of the invention.

FIG. 1 is a block diagram of an entertainment system 100 including a first component 102 and a second component 106. Examples of the components 102, 106 may include a television set-top box, a television, an audio receiver, a DVD player, a DVR, a video cassette recorder (VCR), and other entertainment devices. Also shown in FIG. 1 is a remote control device 104 capable of transmitting signals to both the first component 102 and the second component 106. Further, the remote control device 104 is configured to receive signals transmitted from the first component 102.

Figure 2:
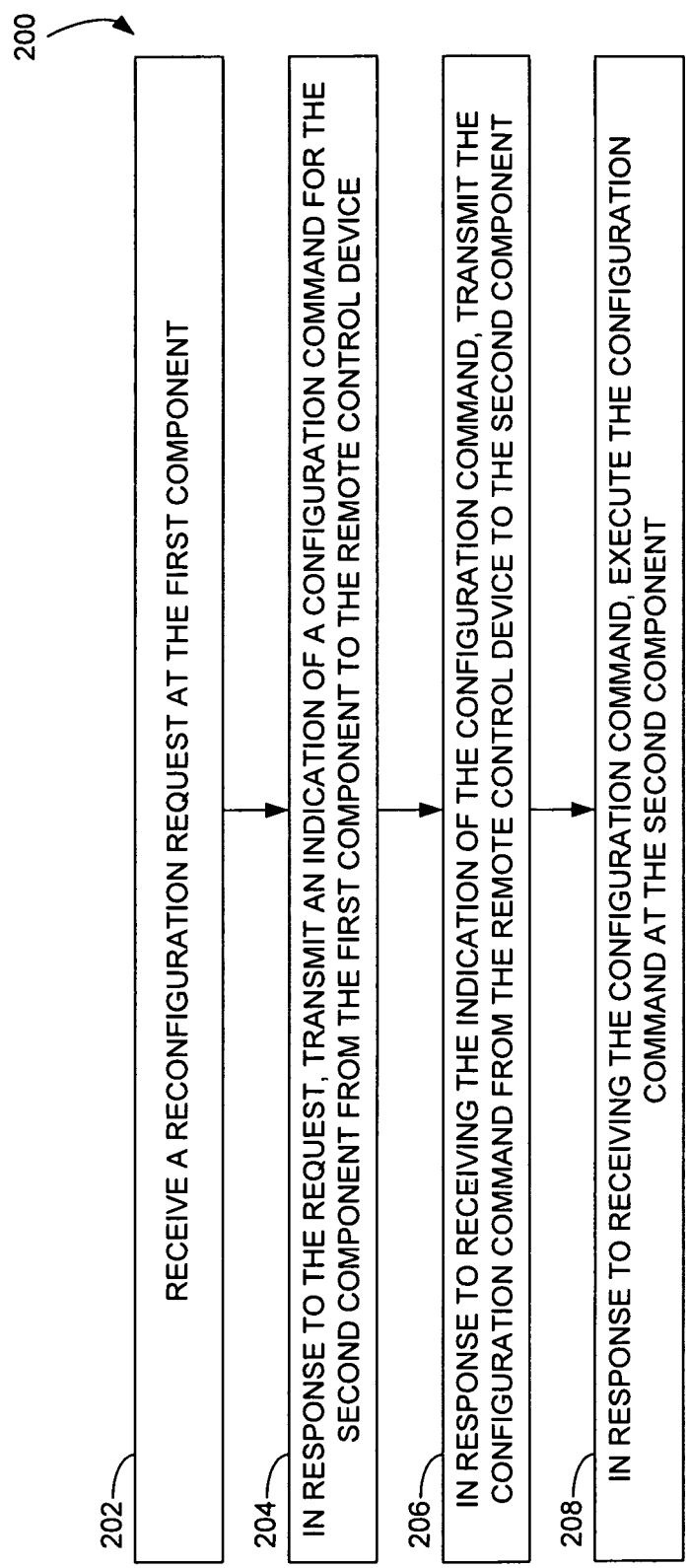
FIG. 2 is a flow diagram of a method for reconfiguring the entertainment system of FIG. 1 according to an embodiment of the invention.

FIG. 2 is a flow diagram describing a method 200 according to an embodiment of the invention for reconfiguring the entertainment system 100 of FIG. 1 to restore audio/video content to a user. While the entertainment system 100 of FIG. 1 is employed as the basis of the method 200, aspects of the method 200 may be utilized in conjunction with other entertainment systems not specifically discussed herein.

Generally, reconfiguration of the entertainment system 100 involves the issuing of configuration commands to at least one of the components 102, 106 of the entertainment system 100 to allow audio and/or video content to be delivered or presented to a user. More specifically, the configuration commands alter operational settings of one or more of the components 102, 106, including, but not limited to, selecting or activating a particular audio/video input or output of a component, selecting a particular input or output programming channel of a component, selecting an audio level of a component, and selecting a power state (i.e., "on" or "off") of a component, which may affect whether the audio and/or video content is presented to the user, such as through a television, audio receiver, and the like.

In the method of FIG. 2, a request 110 to reconfigure the entertainment system 100 is received at the first component 102 (operation 202). In the specific example of FIG. 1, the reconfiguration request 110 is transmitted by the remote control device 104 to the first component 102, possibly as the result of a user initiating the request by interaction with the remote control device 104. However, the reconfiguration request 110 may be generated in other ways, such as by way of the user initiating the request via a user control panel of the first component 102.

In response to the request 110, the first component 102 transmits an indication 112 of a configuration command for the second component 106 to the remote control device 102 (operation 204). In response to receiving the indication 112, the remote control device 104 transmits the configuration command 114 to the second component 106 (operation 206). In response to receiving the configuration command 114, the second component 106 executes the configuration command 114 (operation 208).

While FIG. 2 indicates a specific order of execution of the operations 202-208, other possible orders of execution, including concurrent execution of one or more operations, may be undertaken in other implementations. In another embodiment, a computer-readable storage medium may have encoded thereon instructions for one or more processors or other control logic to direct a device to implement the method 200.

Figure 3:
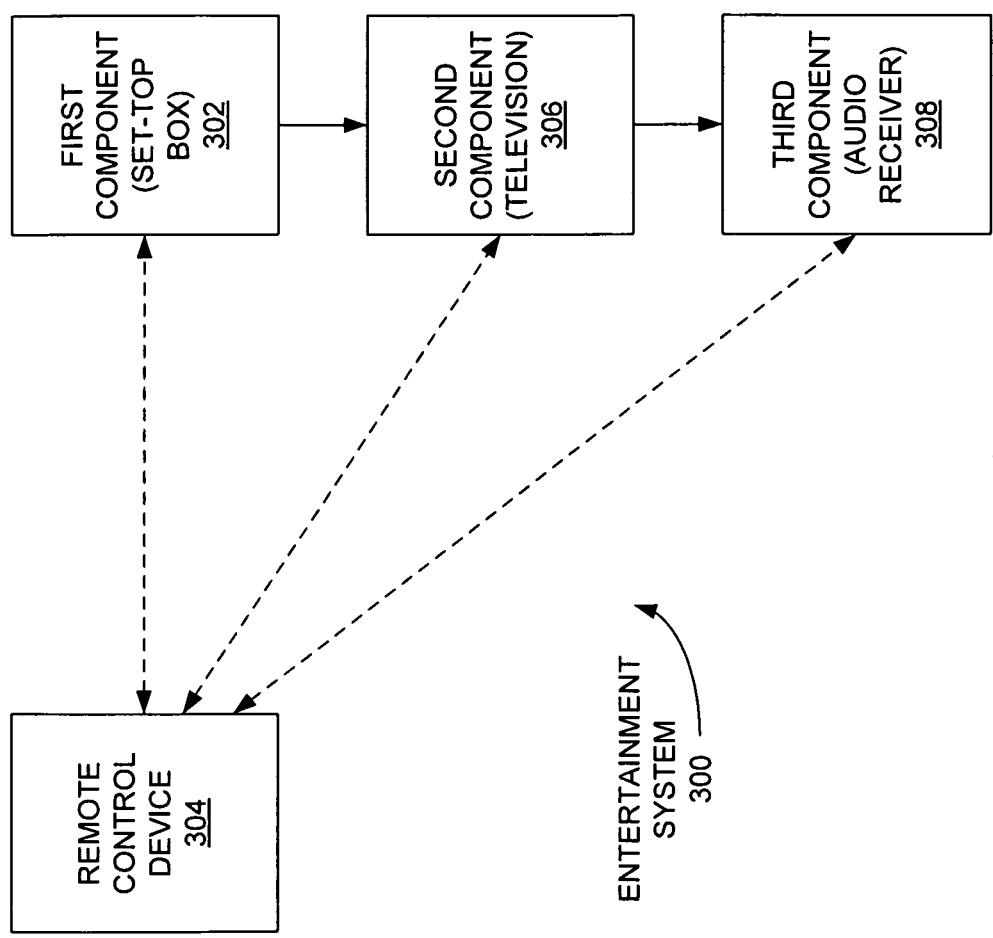
FIG. 3 is a block diagram of an entertainment system according to another embodiment of the invention.

FIG. 3 presents a block diagram of another entertainment system 300 including at least a first component 302 (such as a television set-top box), a second component 306 (in this case, a television), and a third component 308 (for example, an audio receiver). FIG. 3 also illustrates the set-top box 302 being connected to the television 306 so that television signals received and processed by the set-top box 302 may be displayed, while the television 306 is connected to the audio receiver 308 to provide an enhanced audio experience for the user.

Alternate arrangements of the components 302, 306, 308 may be employed in other implementations. For example, the audio receiver 308 may be connected directly to the set-top box 302 instead of the television 306. Such alternate schemes may affect how each component 302, 306, 308 must be configured to present audio and/or video content to a user. Additional components may also be included in the entertainment system 300 in other embodiments, but such components are not specifically indicated in FIG. 3 to simplify and facilitate the following discussion.

Also depicted in FIG. 3 is a remote control device 304 adapted to send communication signals to each of the components 302, 306, 308, as well as to receive communication signals from the first component 302. Generally, the remote control device 304 serves as a relay device for configuration commands specified by the first component 302 for execution by either or both of the second component 306 and the third component 308. As described in greater detail below with respect to one embodiment, the remote control device 304 communicates with the components 302, 306, 308 by way of wireless signals, such as infrared (IR) or radio frequency (RF) signals.

Figure 4:
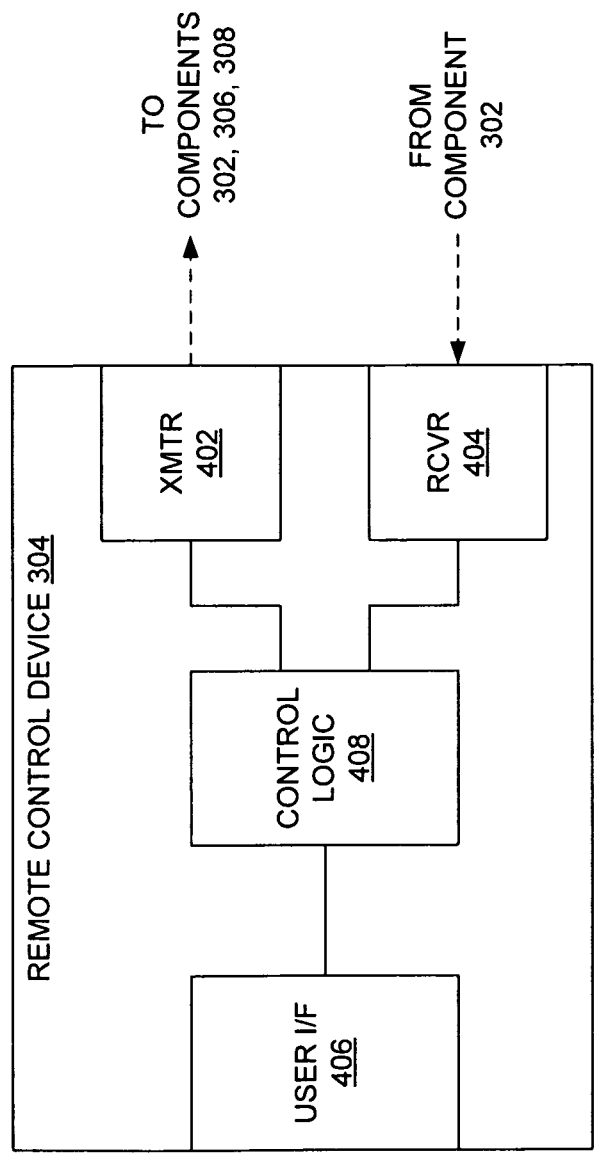
FIG. 4 is a block diagram of a remote control device of the entertainment system of FIG. 3 according to an embodiment of the invention.

FIG. 4 provides a block diagram of the remote control device 304 according to one embodiment. As shown, the remote control device 304 includes a transmitter 402, a receiver 404, a user interface 406, and control logic 408. Other components possibly included in the remote control device 304, such as a memory or other data storage, a battery compartment, and the like, are not discussed herein to simplify the discussion concerning the operation of the remote control device 304.

In one implementation, the transmitter 402 is a wireless transmitter, such as an infrared transmitter, configured to transmit communication signals to any of the components 302, 306, 308 of the entertainment system 300. In somewhat complementary fashion, the receiver 404 is a wireless receiver, such as an infrared receiver, configured to receive communication signals from at least the first component 302 of the system 300. While the specific remote control device 304 discussed herein employs infrared communications, other types of optical or electromagnetic communication technologies may be employed in other implementations.

The user interface 406 of the remote control device 304 may include keys, buttons, touchpads, joysticks, and/or other user input components, as well as light-emitting diodes (LEDs), liquid-crystal diode (LCD) displays, audio speakers, and/or other types of user output devices.

Each of the transmitter 402, receiver 404, and user interface 406 is coupled with the control logic 408, which communicates with, and possibly controls, the other portions 402, 404, 406 of the remote control device 304. The control logic 408 may include any control circuitry capable of performing the various tasks described below in conjunction with the remote control device 304. For example, the control logic 408 may be a processor, such as a microprocessor, microcontroller, or digital signal processor (DSP), configured to execute instructions directing the processor to perform the functions discussed in detail below. In another implementation, the control logic 408 may be hardware-based logic, or may include a combination of hardware, firmware, and/or software elements.

In operating the entertainment system 300, such as by way of the remote control device 304, a user may have inadvertently altered the configuration of one or more of the components 302, 306, 308, such as changing a channel of the television 306, modifying the current audio/video input of the television 306, or altering the audio input of the audio receiver 308, resulting in a loss of audio and/or video being presented at the television 306 and/or the audio receiver 308. To facilitate an automatic reconfiguration to restore the audio/video program of interest to the user, the user may initiate a reconfiguration operation, alternately termed a "recover" operation or mode.

In the entertainment system of FIG. 3, the first component 302 (i.e., the set-top box 302) possesses the majority of the intelligence in the system 300 to perform the requested reconfiguration of the various components 302, 306, 308. While the first component 302 is specifically identified as a television set-top box, other types of entertainment system components, such as televisions, DVD players, audio receivers, and the like, may possess such intelligence in other implementations.

Figure 5:
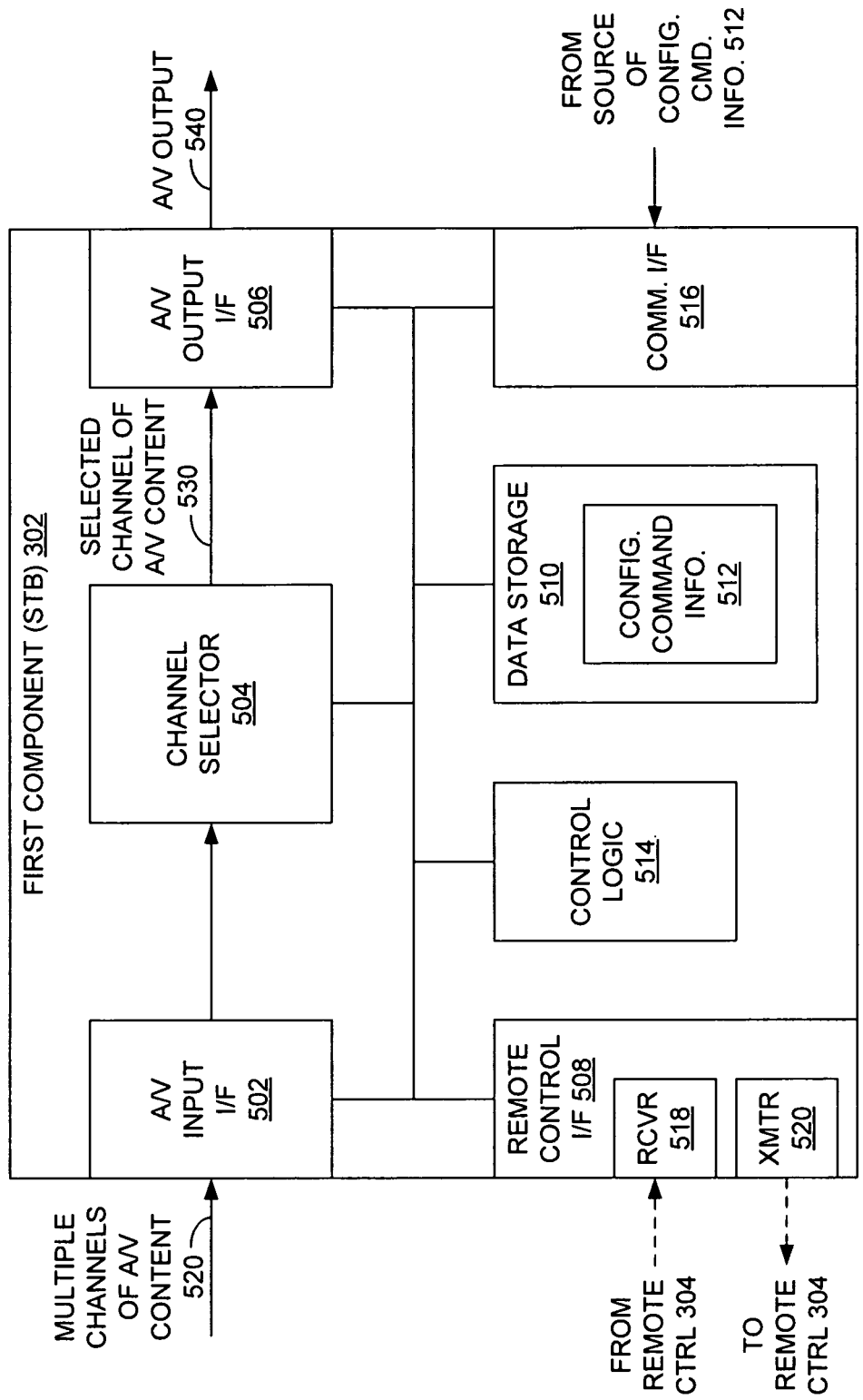
FIG. 5 is a block diagram of a component of the entertainment system of FIG. 3 according to an embodiment of the invention.

FIG. 5 provides a block diagram of the first component (i.e., television set-top box) 302 of FIG. 3. As illustrated, the set-top box 302 includes, in part, an audio video/input interface 502, a channel selector 504, and an audio/video output interface 506. The audio/video input interface 502 may receive multiple channels of audio/video content 520, such as that available by way of satellite antenna, terrestrial antenna, fiber optic connection, or cable. The audio/video input interface 502 may include circuitry to down-convert and otherwise process the multiple channels of content 520 before passing the content 520 to the channel selector 504, which selects one of the channels of content 520. The channel selector 504 forwards the content 530 of the selected channel to the audio/video output interface 506, which decodes and otherwise processes the content 530 for presentation as audio/video output 540 to the user by way of the television 306 and/or the audio receiver 308 of FIG. 3. Other components may also be included for processing the received content 520, such as circuitry for decrypting and demultiplexing the content, but such components are not discussed herein to simplify the discussion below.

The set-top box 302 of FIG. 5 also includes a remote control interface 508, data storage 510, control logic 514, and possibly a communication interface 516. Similar to the remote control device 304, the remote control interface 508 of the set-top box 302 may include a wireless receiver 518, such as an infrared receiver, for receiving communications from the remote control device 304, as well as a wireless transmitter 520, such as an infrared transmitter, for transmitting communications to the remote control device 304. As with the remote control device 304, the transmitter 520 and the receiver 518 of the set-top box 302 may utilize any type of communication technology in other implementations.

The data storage 510 may be any type of data storage for storing configuration command information 512, described more fully below. Examples of the data storage 510 may include random access memory (RAM), read-only memory (ROM), flash memory, or other integrated circuit (IC) based memory. In other implementations, the data storage 510 may include a magnetic disk drive, optical disk drive, or other device-centric data storage.

The configuration command information 512 may be any information allowing the set-top box 302 to initiate one or more configuration commands executable by other components of the entertainment system, such as the second component 306 and the third component 308 of FIG. 3. For example, the configuration information 512 may include a numeric or digital representation of each of the configuration commands, the actual infrared (IR) communication code associated with each of the configuration commands, and/or other related information. As mentioned above, each of the configuration commands for a particular component 306, 308 may select or alter a function of the component 306, 308 that affects the ability to deliver audio and/or video content to the user. Such functions include audio or video input selection, audio or video output selection, audio level control, power control, and the like.

Given the large number of potential components sold by a variety of manufacturers that may be coupled with the set-top box 302, as well as the introduction of new entertainment products to the marketplace on a continual basis, the set-top box 302 may employ the communication interface 516 to download new or replacement configuration command information 512 from a communication network into the data storage 510. In one example, the communication interface 516 may be a telephone network interface adapted to communicate with a source of the configuration command information 512, such as a provider of audio/video programming associated with the set-top box 302. Other communication networks, such as the Internet or other wide-area network (WAN) may be employed to similar end. In another implementation, the configuration command information 512 may be embedded within the audio/video content 520 received by the set-top box 302. The set-top box 302 may request updates to such information on a periodic basis from the source. In another embodiment, the source may "push" such information to the set-top box 302 from time to time, or whenever new information becomes available.

The configuration command information 512 may also include a "known-good" configuration for the entertainment system 300 as previously generated by the set-top box 302. For example, if a previous use of the reconfiguration mode yielded an operational configuration for the entertainment system 300, the set-top box 302 may store the resulting configuration of the various components 302, 306, 308 in the configuration command information 512. Thereafter, if the reconfiguration mode is initiated, the set-top box 302 may first issue configuration commands resulting in the saved configuration in an initial attempt to restore the entertainment system 300 to an operational configuration.

In one particular implementation, the configuration command information 512 may include some indication of the identity of the other components 306, 308 residing within the entertainment system 300 along with the first component (set-top box) 302. For example, the set-top box 302, by way of the connected television 306, may provide the user a selection menu through which the user may employ the remote control device 304 to select their particular television 306, audio receiver 308, and so on from a list of available entertainment component models. Once the user selects the components 306, 308 currently installed in the system, the set-top box 302 may then restrict the possible configuration commands to be issued to only those commands executable by the installed components 306, 308. In another embodiment, the user may also be able to use the menu system of the set-top box 302 to specify how the components 306, 308 are coupled with the set-top box 302, such as serially or in parallel, as noted above. This additional information may further decrease the number of possible configuration commands to be issued by the set-top box 302, thus reducing the amount of time consumed by the set-top box 302 in stepping through all possible combinations of the component configurations.

Based on the above information, the control logic of the first component 302 may generate a number of different configurations for the second component 306 and the third component 308, any of which may yield an operational configuration that delivers audio/video content to the user. Such information may also be stored in the configuration command information 512, or in some other area of the data storage 510.

Similar to the control logic 408 of the remote control device 304, the control logic 514 of the first component (set-top box) 302 communicates with and controls the various functional blocks of the set-top box 302 discussed above. The control logic 514 may include any control circuitry capable of performing the various tasks ascribed to the set-top box 302. Depending on the particular implementation, the control logic 514 may be a processor, such as a microprocessor, microcontroller, or digital signal processor (DSP), configured to execute instructions directing the processor to perform the functions discussed in detail below. In another embodiment, the control logic 514 may be hardware-based logic, or may include a combination of hardware, firmware, and/or software elements.

The first component 302 may include other circuits or functional blocks not explicitly shown in FIG. 5, such as a DVR, a "smart card" interface, and other circuitry commonly associated with a television set-top box. Such items are omitted to simplify and focus the discussion presented below regarding reconfiguration of the entertainment system 300.

Figure 6:
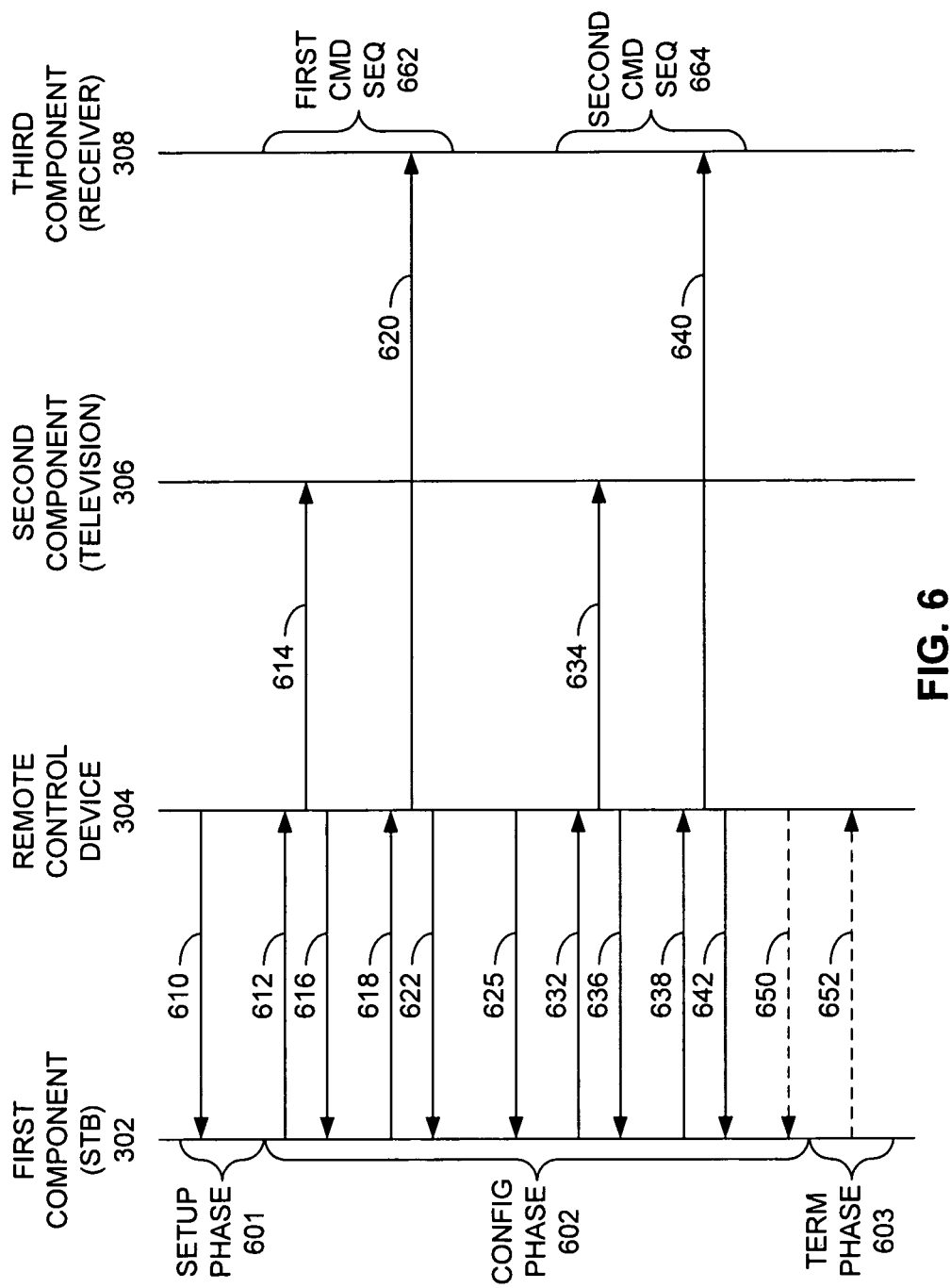
FIG. 6 is a messaging diagram for reconfiguring the entertainment system of FIG. 3 according to an embodiment of the invention.

FIG. 6 provides a messaging diagram depicting the various possible communications among the remote control device 304 and the entertainment system components 302, 306, 308 to allow reconfiguration of one or more of the components 302, 306, 308. As indicated in FIG. 6, the reconfiguration is initiated by way of a reconfiguration request 610 transferred from the remote control device 304 to the first component 302. In another example, the request 610 may result from the user interacting with a user panel located on the component 302. Other means of initiating the reconfiguration process are also possible. Such actions cause the remote control device 304 and the set-top box 302 to enter an initial "setup" phase 601 of the reconfiguration process or mode, as is shown in FIG. 6.

In one example, the user may press a specific button or key on the remote control device 304, such as a "recover" key, to enter the setup phase. Further, the control logic 408 of the remote control device 304 may require the user to hold down the key for a predetermined amount of time, such as two or three seconds, to prevent inadvertent initiation of the reconfiguration process or mode. In one implementation, the remote control device 304 may signify to the user that the reconfiguration mode has been entered visually, such as by way of flashing one or more LEDs on the remote control device 304, causing the first component 302 to flash one or more LEDs in a similar manner, emitting an audible tone, or employing any other type of indication to alert the user that the system is entering the reconfiguration mode.

In another implementation, the set-top box 302, upon receiving the reconfiguration request 610, may present a "recover" display screen to its audio/video outputs during the setup phase 601. As a result, if at any point during the reconfiguration process an operational configuration has been achieved for delivering audio/video content to the user, the user will be able to view the recover screen and ascertain that the reconfiguration of the system 300 has been successful without relying on the presence of a particular broadcast channel or other video source.

Other actions may be taken by either the remote control device 304 or the first component 302 during the setup phase 601 in preparation to reconfigure the system 300. For example, the remote control device 304 may be configured to ignore other user input by way of keys, buttons, or other input means while the setup phase 601 of the reconfiguration mode is occurring, thus preventing any confusion regarding whether the reconfiguration mode is still active. However, after the completion of the setup phase 601, the user may press a key other than the "recover" key to exit the reconfiguration mode before entering the configuration phase 602 in one implementation. The user may be motivated to exit the reconfiguration mode at such an early stage if, for example, entering the reconfiguration was inadvertent.

Once the setup phase 601 has been completed, the remote control device 304 and the first component 302 may then enter the configuration phase 602, during which time one or more configuration commands are transmitted to the various components, such as the television 306 and the audio receiver 308, in an attempt to recover the audio/video content for presentation to the user by way of these two components 306, 308.

In the configuration phase 602, the first component 302 may employ a list of configuration commands intended for one or more of the other components 306, 308 of the entertainment system. These commands may be derived from the configuration command information 512 stored in the data storage 510, as mentioned above. In one implementation, the configuration commands may be organized into groups of one or more commands intended to be executed as a set or sequence to place the entertainment system 300 in a desired state. For example, the set-top box 302 may issue a configuration command to each of the television 306 and the audio receiver 308 to place those components in a particular state prior to allowing the user to indicate whether that state is operational. In other situations, multiple commands may be issued to a single component 306, 308 in a sequence, and commands issued to each of multiple components 306, 308 may be included in a single sequence.

In the simple scenario depicted in FIG. 6, two sequences of configuration commands are issued. More specifically, in a first command sequence 662, a first configuration command 614 is issued to the second component 306, and a second configuration command 620 is transferred to the third component 308. Similarly, in a second command sequence 664, a third configuration command 634 is transmitted to the second component 306, after which a fourth configuration command 640 is issued to the third component 308.

Regarding the first command sequence 662, the set-top box 302 initiates the process by transmitting an indication 612 of the first configuration command 614 to the remote control device 304. The indication 612 may take any of a number of forms. For example, if the remote control device 304 includes the wireless communication codes, such as IR codes, for the intended destination component (i.e., the second component 306), the indication 612 may be represented by some numeric code representative of the configuration command 614 to be transferred. If, however, the remote control device 304 does not possess the IR codes or other communication codes required to transmit the desired command 614, the indication 612 may include the actual IR code or communication code associated with the first configuration command 614.

In response to the first component 302 transmitting the indication 612 of the first configuration command 614 to the remote control device 304, such as by way of the first component transmitter 520 and the remote control receiver 404, the remote control device 304 employs its transmitter 402 to transmit the first configuration command 614 to the second component (i.e., the television) 306. In the case the indication 612 is a numeric or digital representation of the command 614, the remote control device 304 determines which communication or IR command code is associated with that representation, possibly by way of a data table residing within the remote control device 304. The remote control device 304 then transmits the command 614 as embodied by the IR code to the second component 306 by way of its transmitter 402. Alternatively, if the indication 612 received by remote control device 304 is the communication or IR code to be transmitted, the remote control device 304 may merely repeat, or "wrap", the indication 612 as the transmitted configuration command 614.

In some implementations, the remote control device 304 may indicate to the user by way of visual or audio means, such as flashing LEDs, audible tones, or other actions, each configuration command being transmitted to one of the components 306, 308 to allow the user to correlate any changes in the configuration of the components 306, 308 with the transmissions of the remote control device 304. In another embodiment, the first component 302 may provide such visual or audible feedback to the user.

In one implementation, after the transmission of the first configuration command 614, the remote control device 304 may transmit a first acknowledgment 616 associated with the command 614 to the first component 302, thus indicating that transmission of the first configuration command 614 to the second component 306 is complete. In response to the first acknowledgment 616, the first component 302 may then transmit an indication 618 of the second configuration command 620. After receiving this second indication 618, the remote control device 304 then transmits the associated second configuration command 620 to the third component (i.e., the audio receiver) 308. After transmission of the second configuration command 620, the remote control device 304 may then transmit a second acknowledgment 622 to the first component 302 to indication completion of the second configuration command 620 transmission.

Typically, all communications from the remote control device 304 to any of the components 302, 306, 308 of the entertainment system 300 are available to all of the components 302, 306, 308 simultaneously. However, only the intended destination normally is configured to receive and process the communications for which it was the intended recipient. In one example, each of the communications, such as the configuration commands 614, 620 or the related acknowledgments 616, 622 discussed above, may incorporate a device or component code embedded within the communication or IR code to signify which of the components 302, 306, 308 is the intended destination of the transmission. In other implementations, the communications between the remote control device 304 and at least one of the components 302, 306, 308 (such as the set-top box 302) may involve one communication technology, such as RF communications, while communications between the remote control device 304 and at least one of the remaining components (e.g., the television 306 and the audio receiver 308) may be IR communications.

In one embodiment, the remote control device 304 may employ a timeout period within the configuration phase 602, during which the user is prevented from issuing commands to any of the components 302, 306, 308. For example, the remote control device 304 may begin ignoring user input beginning at the time the device 304 receives a command indication, such as the first indication 612 discussed above, thus allowing the remote control device 304 to transmit the associated command 614 and acknowledgment 616 without user interruption. Further, after the command 614 and its associated acknowledgment 616 are transmitted to their respective destinations, a first timeout period, such as a one-half second, may be initiated during which user input is still prohibited. This first timeout allows the entirety of the first command sequence 662 to be completed before user input is allowed. More specifically, once the first component (i.e., the set-top box) 302 receives the first acknowledgment 616 from the remote control device 304, the indication 618 of the second configuration command 620 may be issued before the expiration of the timeout period. The remote control device 304, upon receipt of the second indication 618, continues to ignore user input. Once the second configuration command 620 and corresponding acknowledgment 620 are issued, a new timeout period may be initiated to allow yet another command to be issued. This extension of the timeout period may continue for each of the commands in the current command sequence, thus pacing the response of the user while in the recover or reconfiguration mode.

After the completion of the first command sequence 662, as determined by the first component 302, the first component 302 may then await user input as to the effectiveness of the first command sequence 662 in reconfiguring the entertainment system 300 to an operational state. More specifically, once the first component 302 receives the second acknowledgment 622, indicating the last command 620 of the first command sequence 662 has been issued, the first component 302 may then wait for a second timeout period for the user to indicate whether a different configuration should be attempted. In one particular implementation, the second timeout period may be thirty seconds to allow the user ample time to respond. Further, either the remote control device 304 or the first component 302 may notify the user by way of a flashing LED or other means that the system 300 is in a stable configuration and is awaiting user input as to whether the configuration is operational.

In one example, the user may press the same button of the user interface 406 of the remote control device 304 that was employed to initiate the recover mode (e.g., a "recover" key or button) to indicate a user response 625 (transmitted from the remote control device 304 to the first component 302) that the latest configuration is not operational (i.e., does not produce audio and/or video by way of the television 306 and/or the audio receiver 308). If the first component 302 receives this user input prior to the expiration of the second timeout period, the first component 302 may then proceed to the next command sequence (i.e., the second command sequence 664 of FIG. 6). Oppositely, if the first component 302 receives any other type of user input by way of the remote control device 304 (such as an "OK" or "Set" key press on the remote control device 304), or if the first component 302 receives no input from the user prior to the expiration of the second timeout described above, the first component 302 may presume that the current configuration is operational and terminate the recover mode, as described more fully below. In another implementation, in the event the first component 302 does not receive any user input prior to the expiration of the second timeout, the first component 302 may instead presume that the current configuration is not operational and continue with the next command sequence.

In the particular example of FIG. 6, the user indicates by way of the user response 625 that the configuration resulting from the first command sequence 662 is not operational. As a result, the first component (i.e., the set-top box) 302 begins the second command sequence 664 by transmitting an indication 632 of the third configuration command 634. In response to the indication 632, the remote control device 304 issues a third configuration command 634 to the second component 306, followed by a third acknowledgment 636 to the first component 302 to signify that the third configuration command 634 was issued. The remote control device 304 may also utilize a timeout period during which user input is ignored, as described above. While user input is prevented, the first component 302 transmits to the remote control device 304 an indication 638 of a fourth configuration command 640, which the remote control device 304 transmits to the third component 308. After transmitting the fourth configuration command 640, the remote control device 304 transmits a fourth acknowledgment 642 to the first component 302.

As the fourth acknowledgment 642 marks the end of the second command sequence 664, as determined by the first component 302, the first component 302 awaits user input regarding the effectiveness of the resulting system 300 configuration. In the specific example of FIG. 6, the user employs a key other than the "recover" key to denote that the current configuration is operational (i.e. video and/or audio from the set-top box 302 is presented at the television 306 and/or the audio receiver 308), resulting in a user response 650 being transmitted from the remote control device 304 to the first component 302. Alternately, the first component 302 may not receive any user input during the second timeout period described above, or the second command sequence 664 represents the last available command sequence produced by the first component 302. In each case, the first component 302 determines that the configuration phase 602 is ended, and that the termination phase 603 begins.

During the termination phase 603, the first component 302 may transmit a termination indication 652 to the remote control device 304 to signify termination of the reconfiguration mode in one embodiment. Also, in one implementation, either or both of the first component 302 and the remote control device 304 may provide some audio or visual indication, such as flashing LEDs, audible tones, and the like, to notify the user of the end of the recover mode. Further, either or both of the first component 302 and the remote control device 304 may alter their current state to return the system 300 to a standard operating environment. For example, the remote control device 304 may alter its current operating mode to provide user-initiated commands to the set-top box (i.e., the first component) 302. In another implementation, the set-top box 302 may communicate with the remote control device 304 to cause the remote control device 304 to enter that mode.

While several communication messages are described above with respect to FIG. 6, other communications between the first component 302 and the remote control device 304 not specified heretofore may occur during any phase of the recover or reconfiguration mode while remaining with the scope of the present invention.

In addition to initiating the configuration commands described above that are intended for the second component 306 and the third component 308, the first component 302 may also self-execute one or more commands in any command sequence to alter its own configuration or state. Depending on the implementation, the first component 302 may execute such commands before, during, or after any of the configuration commands intended for the other components 306, 308. Also, in one embodiment, such commands may be specified in the configuration command information 512 residing in the data storage 510 of the first component 302.

In some entertainment systems, one or more of the components 306, 308 may employ the Consumer Electronics Control (CEC) functionality specified by the HDMI 1.2 specification. In systems in which the first component 302 is coupled with such a component 306, 308, the first component 302 may issue a configuration command to the CEC-compliant component 306, 308 over the HDMI connection, thus obviating the use of the remote control device 304 for transmitting the command. More specifically, the first component 302 may issue an "Active Source" CEC command to the component 306, 308, thus causing the component 306, 308 to select the input over which the Active Source command was received (i.e., the input coupled to the first component 302 by way of the HDMI connection). In one implementation, such a command may constitute part or all of the first command sequence or any subsequent command sequence initiated by the first component 302.

Presuming the use of IR signaling in communication between the remote control device 304 and the various components 302, 306, 308, and substantial co-location of the components 302, 306, 308, the user may be required to point the remote control device 304 in the general direction of the components 302, 306, 308 so that the transmitter 402 and the receiver 404 of the device 304 are oriented properly to facilitate these communications during the recover mode. In another implementation, the remote control device 304 may increase the power of the transmitter 402 to allow greater freedom of orientation of the remote control device 304 with respect to at least the second component 306 and the third component 308 while still successfully transmitting the configuration commands to those components 306, 308.

Various embodiments as described herein for reconfiguring an entertainment system to an operational state may provide several benefits. In general, allowing the user of the entertainment system to recover the presentation of a lost audio and/or video signal by the simple and limited use of a remote control device may reduce the volume of customer service requests to a call center operated by a programming service provider, or a manufacturer of one or more of the components being employed. Also, by locating most of the intelligence required for implementing the reconfiguration or recover mode in a component as opposed to the remote control device, the scarce electronic resources of the remote control device may be reserved for other functions, while the extensive computational and data storage capability of the component may be utilized to implement the various functional aspects of the recover mode described above. Further, presuming the component is coupled to a service provider or other online source, the component may be able to upgrade the configuration command information to reflect new entertainment products, provide updated command sequences, or revise the reconfiguration mode algorithm at any time via that source.

While several embodiments of the invention have been discussed herein, other embodiments encompassed by the scope of the invention are possible. For example, while various embodiments have been described primarily within the context of a satellite, cable, or terrestrial set-top box implementing the majority of the recover algorithm by providing the various configuration commands, other entertainment devices, such as televisions, video monitors, audio receivers, DVD players, DVRs, VCRs, and the like, may incorporate this same functionality to similar effect. Further, while communications between the various components and the remote control device are primarily characterized above as infrared (IR) communications, other types of communications, such as radio frequency (RF) communications, may be employed in other implementations. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method for reconfiguring an entertainment system to restore audio/video content to a user, the method comprising:
at a first component of the entertainment system, receiving a request to reconfigure the entertainment system;
in response to the request, transmitting an indication of a configuration command for a second component of the entertainment system from the first component to a remote control device;
in response to receiving the indication of the configuration command at the remote control device, transmitting the configuration command from the remote control device to the second component;
after transmitting the configuration command from the remote control device to the second component, transmitting an acknowledgment from the remote control device to the first component acknowledging transmission of the configuration command from the remote control device to the second component; and
at the first component, transmitting a second configuration command for a third component of the entertainment system from the first component to the third component.

2. The method of claim 1, further comprising:
at the first component, transmitting an indication of another configuration command for the second component from the first component to the remote control device if the first component receives within a predetermined period of time a user response to continue reconfiguration of the entertainment system; and
in response to receiving the indication of the second configuration command at the remote control device, transmitting the other configuration command from the remote control device to the second component.

3. The method of claim 1, further comprising:
at the first component, transmitting an indication of the second configuration command for a third component of the entertainment system from the first component to the remote control device if the first component receives within a predetermined period of time a user response to continue reconfiguration of the entertainment system; and in response to receiving the indication of the second configuration command at the remote control device, transmitting the second configuration command from the remote control device to the third component.

4. The method of claim 1, further comprising:
at the first component, in response to the request, executing a configuration command for the first component.

5. The method of claim 1, further comprising:
transmitting an indication of another configuration command for the second component of the entertainment system from the first component to the remote control device in response to receiving the acknowledgment at the first component from the remote control device; and
in response to receiving the indication of the other configuration command at the remote control device, transmitting the second configuration command from the remote control device to the second component.

6. The method of claim 5, further comprising:
at the remote control device, after receiving the indication of the configuration command, ignoring user input until a predetermined period of time after transmitting the acknowledgment to the first component.

7. The method of claim 1, further comprising:
After the transmitting the configuration command from the remote control device to the second component, transmitting the acknowledgment from the remote control device to the first component:
the transmitting the second configuration command for the third component includes transmitting an indication of the second configuration command for the third component of the entertainment system from the first component to the remote control device in response to receiving the acknowledgment at the first component from the remote control device; and
in response to receiving the indication of the second configuration command at the remote control device, transmitting the second configuration command from the remote control device to the third component.

8. The method of claim 7, further comprising:
at the remote control device, after receiving the indication of the first configuration command, ignoring user input until a predetermined period of time after transmitting the acknowledgment to the first component.

9. The method of claim 1, wherein the transmitting the second configuration command for the third component of the entertainment system from the first component to the third component includes transmitting the second configuration command while circumventing the remote control device.

10. The method of claim 1, wherein:
the configuration command for the second component comprises at least one of selecting an input programming channel of the second component, selecting an output programming channel of the second component, selecting a video input of the second component, selecting a video output of the second component, selecting an audio input of the second component, selecting an audio output of the second component, selecting an audio level for the second component, and altering a power state of the second component.

11. The method of claim 1, further comprising:
at the first component, receiving configuration command information for the second component before receiving the request;
wherein the indication of the configuration command is based on the configuration command information.

12. A component of an entertainment system, the component comprising:

a remote control interface configured to communicate with a remote control device;
data storage configured to store configuration command information for a second component of the entertainment system; and
control logic configured to:
receive a request to reconfigure the entertainment system; and
in response to the request, transmit an indication of a first configuration command for the second component to the remote control device by way of the remote control interface, wherein the indication of the first configuration command is based on the configuration command information in the data storage; and
in response to receiving an acknowledgment from the remote control device of transmission of the first configuration command, transmitting a second configuration command for a third component of the entertainment system from the component to the third component via an indication of a the second configuration command sent to the remote control.

13. The component of claim 12, wherein:
the indication of the first configuration command comprises one of a numeric representation of the configuration command and a communication code of the configuration command.

14. The component of claim 12, wherein:
the remote control interface is configured to receive the request and transfer the request to the control logic.

15. The component of claim 12, further comprising:
a communication interface configured to receive the configuration command information for storing in the data storage.

16. The component of claim 12, further comprising:
a component communication interface configured to communicatively couple the component with the third component;
wherein the control logic is configured to transmit a third configuration command by way of the component communication interface to the third component.

17. The component of claim 12, further comprising:
an audio/video input interface configured to receive multiple channels of audio/video content;
a channel selector configured to select one of the multiple channels of audio/video content; and
an audio/video output interface configured to deliver the selected channel of audio/video content to an output device for presentation to a user.

18. The component of claim 17, wherein:
the audio/video input interface comprises at least one of a satellite television input interface, a cable television input interface, and a terrestrial television input interface.

19. A remote control device, comprising:
a receiver configured to receive wireless communication from a first component of an entertainment system;
a transmitter configured to transmit wireless communications to the first component a second component and a third component of the entertainment system;
control logic configured to:
receive an indication of a configuration command for the second component from the first component by way of the receiver;
transfer the configuration command to the second component by way of the transmitter;

after transmitting the first configuration command from the remote control device to the second component, transmit an acknowledgment from the remote control device to the first component; and transmit to the third component a second configuration command for the third component of the entertainment system received from the first component.

20. The remote control device of claim 19, further comprising:

a user interface configured to receive a user request to reconfigure the entertainment system;

wherein the control logic is configured to receive the user request from the user interface and transfer the request to the first component by way of the transmitter.

21. The remote control device of claim 20, wherein:

the control logic is configured to ignore user input from the user interface from when the control logic receives the indication of the configuration command by way of the receiver until a predetermined period of time after the control logic has transferred the acknowledgment to the first component by way of the transmitter.

22. The remote control device of claim 21, wherein:

the control logic is configured to receive an indication of another configuration command during the predetermined period of time by way of the receiver, transfer the other configuration command by way of the transmitter, transfer a second acknowledgment to the first component by way of the transmitter after transferring the other configuration command, and continue to ignore the user input from the user interface until the predetermined period of time after the control logic has transferred the second acknowledgment to the first component by way of the transmitter.

* * * * *